United States Patent Office 3,284,459
Patented Nov. 8, 1966

3,284,459
PYRIDYLTHIOLCARBONATES AND PROCESS
FOR THEIR PRODUCTION
Godfrey Wilbert, Carmel, and Henry Wetstein, Monroe, N.Y., assignors to Nepera Chemical Co., Inc.
No Drawing. Filed Nov. 27, 1964, Ser. No. 414,476
3 Claims. (Cl. 260—294.8)

This invention relates to novel pyridylthiolcarbonates of the formula:

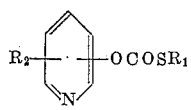

wherein $R_1$ represents lower alkyl such as methyl, ethyl, propyl, butyl, isobutyl and the like; lower alkenyl such as vinyl, allyl and the like; substituted phenyl such as p-chlorophenyl, 3,4-dichlorophenyl, m-methylphenyl, o-bromophenyl, p-ethylphenyl, p-fluorophenyl, p-methoxyphenyl, o-methoxyphenyl, m-butoxyphenyl, p-nitrophenyl, 3,4-dinitrophenyl, 2,4-dinitrophenyl, o-nitrophenyl or heterocyclic such as pyrimidyl, pyridyl, indazolyl, quinolyl, isoquinolyl, dibenzofuryl, furyl and the like; and $R_2$ represents hydrogen or lower alkyl such as methyl, ethyl, propyl, butyl, isobutyl and the like.

This invention also includes within its scope new and novel methods of preparing these compounds.

The compounds of this invention are useful as herbicides, pesticides and as chemicals useful in agricultural chemistry. In addition, they are useful as starting materials for the production of other chemicals useful for herbicides or pesticides.

According to the process of this invention, the compounds of this invention are prepared by treating the corresponding hydroxy pyridine with the appropriately substituted alkyl or aryl chlorothiolformate, $$\text{ClC(O)}-SR_1$$

at a temperature of from 0 to 5° C. in a suitable solvent system such as a mixture of ether and pyridine or pyridine alone. After the reaction is completed, the solvent is removed by distillation or water is added to precipitate the product which may then be recovered by filtration. Further purification may be effected by recrystallization.

In order to further illustrate the practice of this invention, the following examples are given:

EXAMPLE 1

3-hydroxypyridine is dissolved in 30 ml. of pyridine and cooled to +2° C. Methyl chlorothiolformate (11.05 g.) is added over one-half hour, dropwise, with stirring and at a reaction temperature of 2 to 5° C. After the addition is completed the reaction mixture is stirred an additional 30 minutes and allowed to warm slowly to 20 to 30° C. On adding 100 ml. of ice water, S-methyl-O-(3-pyridyl)-thiolcarbonate precipitates as a solid product. The precipitate is recrystallized from hexane to yield the product as a white solid, M.P. 47–48° C.

EXAMPLE 2

*S-phenyl-O-(3-pyridyl)-thiolcarbonate*

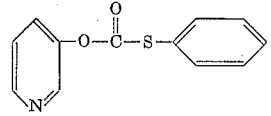

$C_{12}H_9N_1O_2S$    M.W. 231.26

9.5 g. of 3-hydroxypyridine are dissolved in 30 ml. of pyridine and cooled to +2° C. 17.25 g. of phenyl chlorothiolformate are then added over one-half hour with stirring while maintaining the reaction temperature at 2 to 5° C. After the addition is completed, the reaction mixture is stirred for an additional 30 minutes and allowed to warm slowly to 20 to 30° C. On adding 100 ml. of ice water, S-phenyl-O-(3-pyridyl)-thiolcarbonate precipitates as a solid having a M.P. of 60°–62° C. The IR spectrum features a band at 6.0µ for carbonyl absorption.

It is to be understood that the foregoing detailed description is given merely by way of illustration and that many variations may be made therein without departing from the spirit of our invention.

Having described our invention, what we desire to secure by Letters Patent is:

1. A compound of the formula:

wherein $R_1$ is lower alkyl or phenyl.
2. S-methyl-O-(3-pyridyl)-thiolcarbonate.
3. S-phenyl-O-(3-pyridyl)-thiolcarbonate.

References Cited by the Examiner

J. Chem. Soc., London (1963), pages 688–692.

WALTER A. MODANCE, *Primary Examiner.*
ALAN L. ROTMAN, *Assistant Examiner.*